(12) United States Patent
Lenz et al.

(10) Patent No.: US 11,981,593 B2
(45) Date of Patent: May 14, 2024

(54) GLASS TUBE

(71) Applicant: Schott AG, Mainz (DE)

(72) Inventors: Thomas Lenz, Mainz (DE); Andreas Langsdorf, Ingelheim (DE); Fabian Etzold, Ginsheim-Gustavsburg (DE); Christoph Gross, Frankfurt am Main (DE); Ulrich Lange, Mainz (DE); Markus Ollig, Weiden (DE); Arne Riecke, Waldsassen (DE); Wolfgang Wallat, Klein-Winternheim (DE)

(73) Assignee: Schott AG, Mainz (DE)

( * ) Notice: Subject to any disclaimer, the term of this patent is extended or adjusted under 35 U.S.C. 154(b) by 219 days.

(21) Appl. No.: 17/313,624

(22) Filed: May 6, 2021

(65) Prior Publication Data

US 2021/0347670 A1    Nov. 11, 2021

(30) Foreign Application Priority Data

May 6, 2020  (EP) ..................................... 20173251

(51) Int. Cl.
*C03B 17/04* (2006.01)
*A61J 1/06* (2006.01)
(Continued)

(52) U.S. Cl.
CPC .............. *C03B 17/04* (2013.01); *A61J 1/065* (2013.01); *A61J 1/1468* (2015.05); *C03C 3/087* (2013.01); *C03C 3/091* (2013.01)

(58) Field of Classification Search
CPC ......... A61J 1/065; A61J 1/1468; C03C 3/087; C03C 3/091; C03B 17/04
See application file for complete search history.

(56) References Cited

U.S. PATENT DOCUMENTS

| 4,388,094 A | 6/1983 | Carpenter et al. |
| 5,138,218 A | 8/1992 | Honda et al. |
| (Continued) | | |

FOREIGN PATENT DOCUMENTS

| DE | 199 60 210 C1 | 7/2001 |
| DE | 10 2018 101 842 A1 | 8/2019 |
| (Continued) | | |

OTHER PUBLICATIONS

German Office Action dated Nov. 27, 2020 for German Application No. 20 173 251.8 (5 pages).

(Continued)

*Primary Examiner* — Yan Lan
(74) *Attorney, Agent, or Firm* — Taylor IP, P.C.

(57) ABSTRACT

A glass tube, such as a glass tube for the production of containers for storage of pharmaceutical compositions, facilitates production of pharmaceutical containers with high quality. The glass tube has a relative cross-sectional area deviation defined as $$\frac{QF_{max} - QF_{min}}{1.5\ m}.$$

$$\frac{QF_{max} - QF_{min}}{1.5\ m}$$

is less than $k*x+t$. $QF_{max}$ is the highest cross-sectional area and $QF_{min}$ is the lowest cross-sectional area of at least two cross-sections of the glass tube, the cross-sections being (Continued)

spaced apart from each other along a length of the glass tube, and k is 0.0023 m$^{-1}$, t is less than 0.15 mm$^2$/m and x is $$\frac{QF_{max} + QF_{min}}{2}.$$

18 Claims, 5 Drawing Sheets

(51) Int. Cl.
    *A61J 1/14*     (2023.01)
    *C03C 3/087*     (2006.01)
    *C03C 3/091*     (2006.01)

(56) References Cited

U.S. PATENT DOCUMENTS

| | | |
|---|---|---|
| 10,000,300 B2 | 6/2018 | Haeberlein |
| 2006/0130525 A1* | 6/2006 | Buellesfeld ............ C03B 17/04 65/68 |
| 2017/0320766 A1 | 11/2017 | De Angelis et al. |
| 2023/0123424 A1 | 4/2023 | Arai |

FOREIGN PATENT DOCUMENTS

| | | |
|---|---|---|
| EP | 3 345 876 A1 | 7/2018 |
| EP | 3 907 198 A1 | 11/2021 |
| JP | 8-283031 A | 10/1996 |
| JP | 2008-37713 A | 2/2008 |
| JP | 2009-234873 A | 10/2009 |
| JP | 2015-40139 A | 3/2015 |
| JP | 2017-78003 A | 4/2017 |

OTHER PUBLICATIONS

Machine translation of Japanese Patent No. 2017-78003 dated Nov. 24, 2020 (16 pages).
European Office Action dated Nov. 15, 2021 for European Patent Application No. 20173251.8 (2 pages).
Chinese Office Action dated Nov. 24, 2021 for Chinese Application No. 2021209496100 (2 pages).
English translation of Chinese Office Action dated Nov. 24, 2021 for Chinese Application No. 202120949610.0 (2 pages).
English machine translation of DE 199 60 210 C1 dated Jul. 26, 2001 (7 pages).
European Search Report dated Nov. 19, 2020 for European Patent Application No. 20182696.3 (4 pages).
European Office Action dated Jan. 14, 2021 for European Patent Application No. 20182696.3 (6 pages).
English translation of Chinese Office Action dated May 24, 2023 for Chinese Application No. 202110718035.9 (9 pages).

* cited by examiner

GLASS TUBE

CROSS REFERENCE TO RELATED APPLICATIONS

This application claims priority to European Patent Application EP 20173251.8, filed on May 6, 2020, which is incorporated in its entirety herein by reference.

BACKGROUND OF THE INVENTION

1. Field of the Invention

The present invention relates to a glass tube, in particular a glass tube for the production of containers for storage of pharmaceutical compositions. The glass tube facilitates production of pharmaceutical containers with particularly high quality. Further, the present invention relates to a method for the production of a glass tube.

2. Description of the Related Art

For the production of glass tubes, in particular glass tubes for the production of pharmaceutical containers, such as ampoules, vials, cartridges or syringes, the so-called Danner process is often used. In the Danner process, a glass melt emerging out of a melting tank flows onto the outer surface of a rotating tubular body (so-called Danner mandrel) to form thereon a hollow glass melt body. The glass melt is drawn from the mandrel, which serves as a shaping member, in a predetermined direction to a forward end. The inner profile of the glass tube is substantially determined by the outer contour near the front end of the mandrel.

Such glass tubes are semi-finished products for the production of said containers for storage of pharmaceutical compositions. As disclosed in DE 10 2018 101 842 A1, such glass tubes are typically converted to the containers via a hot forming process by using a glass processing de-vice.

EP 3 345 876 A1 teaches glass tubes for pharmaceutical containers. The glass tubes have a certain thickness deviation that defines the difference of a maximum wall thickness and a minimum wall thickness relative to a target thickness of the tube. The best example glass tube has a thickness deviation of 3%. A thickness deviation in that magnitude needs further improvement.

Although state of the art glass tubes often have quite acceptable uniformity in terms of inner and outer diameter, accuracy of hot forming processes still needs improvement. Particularly, hot forming processes for making pharmaceutical containers from glass tubes tend to be difficult to run stably, because a vast number of parameters needs to be optimized in order to ac-count for variations in quality of the hot-formed product.

What is needed in the art is a way to provide an improved glass tube, especially to provide a glass tube that provides for improved accuracy and/or simplified optimization of parameters in a hot forming process.

SUMMARY OF THE INVENTION

In some exemplary embodiments provided according to the present invention, at least one glass tube includes a glass and has a relative cross-sectional area deviation defined as $$\frac{QF_{max} - QF_{min}}{1.5\,\text{m}} \cdot \frac{QF_{max} - QF_{min}}{1.5\,\text{m}} < k \cdot x + t.$$

$QF_{max}$ is a highest cross-sectional area and $QF_{min}$ is a lowest cross-sectional area of at least two cross-sections of the at least one glass tube. The at least two cross-sections are spaced apart from each other along a length of the at least one glass tube, and k is 0.0023 $m^{-1}$, t is less than 0.15 $mm^2/m$ and x is $$\frac{QF_{max} + QF_{min}}{2}.$$

In some exemplary embodiments, a process for producing glass tubes is provided. The process includes: applying a glass melt onto an outer surface of a rotating conical mandrel by guiding the glass melt from a stirred feed tank through an outlet, the melt forming a strand of molten glass that flows from the outlet onto the outer surface of the mandrel; forming a hollow glass melt body on the conical mandrel; drawing the hollow glass melt body from the conical mandrel in a predetermined direction toward a front end for forming a glass tube, the outer surface having a wetting zone where the glass strand first contacts the conical mandrel, a spatial variation of the wetting zone of the applied glass melt being continuously monitored by measuring a horizontal movement of an edge of the glass strand, the horizontal movement being essentially parallel to a drawing direction; reducing the spatial variation by adjusting one or more process parameters selected from at least one of a lateral position of the conical mandrel relative to the outlet, a vertical position of the conical mandrel relative to the outlet, a stirring speed in the feed tank, a glass temperature, a tilt angle of the conical mandrel, or a rotational speed of the conical mandrel; cooling the hollow glass melt body; and cutting the cooled glass melt body into glass tubes.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

In some embodiment, the invention provides a glass tube having a relative cross-sectional area deviation defined as $$\frac{QF_{max} - QF_{min}}{1.5 \text{ m}} \cdot \frac{QF_{max} - QF_{min}}{1.5 \text{ m}} < k \cdot x + t.$$

$QF_{max}$ is the highest cross-sectional area and $QF_{min}$ is the lowest cross-sectional area of at least two cross-sections of the tube. The cross-sections are spaced apart from each other along the length of the glass tube, and k is 0.0023 m$^{-1}$, t is 0.15 mm$^2$/m or less and x is $$\frac{QF_{max} + QF_{min}}{2}.$$

At least two cross-sections, such as those corresponding to $QF_{max}$ and $QF_{min}$, may be spaced apart from each other by at least 0.5 m, by at least 0.75 m, by at least 1.0 m, or by at most 1.5 m or at most 1.4 m. In some embodiments, the cross-sections are spaced apart by about 0.5 m, about 0.75 m, about 1.0 m or about 1.5 m. Optionally, $QF_{max}$ is the highest cross-sectional area of the entire glass tube and $QF_{min}$ is the smallest cross-sectional area of the entire glass tube.

In some embodiments, the glass tube may have a relative cross-sectional area deviation $$\frac{QF_{max} - QF_{min}}{1.5 \text{ m}}$$

of less than 0.50 mm$^2$/m, less than 0.45 mm$^2$/m, less than 0.40 mm$^2$/m, less than 0.35 mm$^2$/m or less than 0.30 mm$^2$/m. In some embodiments, the relative cross-sectional area deviation is less than 0.25 mm$^2$/m, less than 0.20 mm$^2$/m, less than 0.15 mm$^2$/m or less than 0.10 mm$^2$/m. The relative cross-sectional area deviation $$\frac{QF_{max} - QF_{min}}{1.5 \text{ m}}$$

may be at least 0.001 mm$^2$/m, at least 0.01 mm$^2$/m or at least 0.02 mm$^2$/m.

Optionally, $$\frac{QF_{max} - QF_{min}}{2}$$

may be at least 10.0 mm$^2$, at least 12.0 mm$^2$, at least 15.0 mm$^2$, at least 17.0 mm$^2$, or at least 20.0 mm$^2$.

$$\frac{QF_{max} - QF_{min}}{2}$$

may be limited to 150.0 mm$^2$ or less, 100.0 mm$^2$ or less, 90.0 mm$^2$ or less or 80.0 mm$^2$ or less. In some embodiments, t may be 0.10 mm$^2$/m or less, 0.05 mm$^2$/m or less, 0.01 mm$^2$/m or less, -0.02 mm$^2$/m or less, -0.025 mm$^2$/m or less, or -0.028 mm$^2$/m or less. In some embodiments, k may be 0.0020 m$^{-1}$, 0.0018 m$^{-1}$, 0.0015 m$^{-1}$, 0.0010 m$^{-1}$, or 0.0005 m$^{-1}$.

Surprisingly, it was found that the cross-sectional area of glass tubes can vary significantly from glass tube to glass tube and along the length of a glass tube. These variations of cross-sectional areas along the tube length impede production accuracy of pharmaceutical containers that are made from these glass tubes. It is particularly difficult to optimize the parameters of a hot forming process in order to account for cross-sectional area variations. A glass tube is a semi-finished product that can be used for production of syringes, vials, ampoules, cartridges or other pharmaceutical containers. These containers are typically produced in hot forming processes. Hot forming includes heating the glass tube to a temperature where the glass can be formed to the desired shape. Depending on the mass of glass to be heated to the desired temperature, different amounts of heat will be needed. Adjusting the amount of heat used during hot-forming is difficult as these processes produce pharmaceutical containers at very high rates. Because of these high production rates, controlling the heat depending on glass tube properties is hardly possible. It was found that controlling relevant glass tube properties is essential so that the amount of heat used in the production of pharmaceutical containers can remain constant.

Using the appropriate amount of heat during hot-forming of glass is essential because viscosity of glasses varies dramatically with temperature. Between room temperature and the temperature in the melting vessel, glass viscosity may change by a factor of 10$^{17}$. Thus, a small temperature deviation may have a strong impact on glass viscosity. A different viscosity has a strong impact on hot-forming of containers. The hot-forming parameters have to account for this behavior. Typically, the Vogel-Fulcher-Tammann (VFT) equation is used to calculate the temperature needed to achieve a certain viscosity of a glass (see DIN ISO 7884-2:1998-2):

$$lg\eta = A + \frac{B}{T - T_0}$$

In the VFT equation, $\eta$ is the viscosity, A and B are temperature independent parameters of the material, T is the temperature and $T_0$ is the Vogel temperature. A, B and $T_0$ are constant for any specific glass.

It is evident that temperature has a strong influence on viscosity and that the temperature dependence can be described with the constants in the VFT equation. If the temperature is too low, the glass will have a high viscosity, making it difficult to form an accurate pharmaceutical container. If the temperature is too high, viscosity may be too low so that sagging may occur, yielding distorted containers. Specifications have focused on tolerances of outer diameters of glass tubes, neglecting local deviations and gradients in cross-sectional areas. It was found that glass tubes with excellent uniformity of cross-sectional areas perform very well in subsequent manufacturing processes of pharmaceutical containers such as syringes, vials, ampoules and cartridges.

In some embodiments, the glass of the glass tube may have a value B of at least 4000, at least 4500 or at least 5000. Optionally, the B value may be up to 12000, up to 10000 or up to 9000. $T_0$ may be at least 1° C., at least 10° C., at least 70° C. or at least 200° C. In some embodiments, T₀ ranges up to 250° C., or up to 230° C. A may be less than 0, such as less than −0.5 or less than −1.0. In some embodiments, A is at least −5.0, at least −4.0 or at least −3.5. In some embodiments, A may reach from −5.0 to 0.0 or from −4.0 to 0.0. Glass tubes having the low cross-sectional area deviations described herein and these VFT constants perform excellently in container hot-forming.

Optionally, the glass may have the following VFT constants: A ranging from −5.0 to 0.0; B ranging from 4000 to 12000 and/or $T_0$ ranging from 1° C. to 250° C. In an embodiment, A ranges from −3.0 to −1.0; B ranges from 4000 to 9000 and/or $T_0$ ranges from 200° C. to 250° C. For the glass of the glass tube provided according to the invention, $T_g$ may be in the range of from 525° C. to 600° C.

In some embodiments, the present invention provides a glass tube having a uniformity factor of at least 0.99, the factor being the ratio of the lowest cross-sectional area and the highest cross-section area of the entire glass tube. In some embodiments, the glass tube has a uniformity factor of at least 0.990, at least 0.993, at least 0.995, or at least 0.998.

It was observed that cross-sectional area deviations typically occur as gradients along a glass tube length. It is hypothesized that these deviations result from irregularities of the glass feed mechanism used in glass tube production. Particularly, these deviations may be the result of an instable glass strand at the location where the strand first touches the mandrel, wherein "instable" means that the strand moves in a direction parallel to the glass drawing direction.

A glass tube having the cross-sectional area features according to the present invention not only provides highly uniform cross-sectional areas along the length but also a uniform glass mass distribution. A relative cross-sectional area deviation as described allows for an optimal adjustment of the processing parameters in a subsequent hot forming process for making pharmaceutical containers from said glass tube which will ultimately result in improved pharmaceutical containers and process stability.

The term "glass tube" as used herein refers to a hollow glass body for the production of containers for storage of substances for pharmaceutical applications, such as ampoules, vials, syringes and/or cartridges. The glass tube typically has a wall surrounding a lumen and two open ends.

Such a glass tube may consist of a borosilicate glass, such as of a borosilicate glass comprising the following oxides, in percent (%) by weight, based on the total amount of glass:

| | |
|---|---|
| $SiO_2$ | 50-90 |
| $B_2O_3$ | 0-20 |
| $Al_2O_3$ | >0-18 |
| $Na_2O$ | 0-15 |
| $K_2O$ | 0-5 |
| $Li_2O$ | 0-2 |
| CaO | 0-15 |
| BaO | 0-6 |
| $ZrO_2$ | 0-5 |
| $TiO_2$ | 0-5 |
| $Fe_2O_3$ | 0-3 |

The choice of glass components influences the temperature dependence of glass viscosity. For example, addition of certain amounts of $SiO_2$ will decrease the value for A, and increase the B value and $T_0$ in the VFT equation. The following table summarizes the influence of glass components on the VFT constants, wherein "+" refers to an increasing effect, "++" means that the respective constant is increased strongly, "−" refers to a decreasing effect, "−−" means that the respective constant is strongly decreased by an increased amount of the respective glass component.

| | A | B | $T_0$ |
|---|---|---|---|
| $Na_2O$ | ++ | −− | − |
| $K_2O$ | − | − | −− |
| CaO | −− | − | ++ |
| MgO | −− | ++ | −− |
| $Al_2O_3$ | ++ | + | ++ |
| $SiO_2$ | −− | ++ | ++ |

The glass may comprise $SiO_2$ in a proportion of at least 50% by weight, such as at least 55% by weight, at least 60% by weight, or at least 65% by weight based on the total amount of glass. $SiO_2$ is an important network former in the glass matrix which influences the glass properties. In particular, $SiO_2$ is especially important for the chemical resistance of the glass. The content of $SiO_2$ in the glass may be at most 90% by weight, such as at most 85% by weight, or at most 80% by weight based on the total amount of glass. Too high of a content of $SiO_2$ may result in a strong increase of the softening point of the glass.

Besides $SiO_2$ the glass may also comprise at least one second network former. The glass may contain $B_2O_3$ as an additional network former which is contained in a proportion of at least 3% by weight, such as at least 4% by weight or at least 6% by weight, based on the total amount of glass. Through its network forming properties $B_2O_3$ essentially supports the stability of the glass. In the case of too low contents of $B_2O_3$ the required stability in the borosilicate glass system cannot be guaranteed. Nevertheless, the content of $B_2O_3$ in the glass is at most 20% by weight, such as at most 15% by weight or at most 12% by weight, based on the total amount of glass. In the case of too high of a content of $B_2O_3$ in the glass, the viscosity may be reduced strongly so that a reduction of the crystallization stability has to be accepted.

Further, the borosilicate glass may comprise aluminum oxide. The addition of aluminum oxide serves to improve glass forming and generally supports chemical resistance. The proportion of aluminum oxide in the glass may be at most 12% by weight, such as at most 9% by weight or at most 7% by weight, based on the total amount of glass. However, too high of a content of aluminum oxide result in an increased tendency to crystallization. In some embodiments, the amount of aluminum oxide in the glass is at least 1% by weight, such as at least 2.5% by weight or at least 4% by weight, based on the total amount of glass.

The glass may comprise alkali metal oxides in a proportion of at least 3% by weight, such as at least 5% by weight or at least 6% by weight, based on the total amount of glass. $Na_2O$ and $K_2O$ may both be contained in the glass.

Alkali metal oxides improve the meltability of the glass and thus allow an economic production. During the production of the glass they serve as fluxing agents. The sum of the alkali metal oxides in the glass should not exceed the value of 20% by weight, such as 13% by weight or 10% by weight. If the contents of alkali metal oxides are too high the weathering resistance of the glass may be compromised and thus the range of applications thereof may strongly be limited.

The proportion of $Na_2O$ in the glass may be at least 3% by weight, such as at least 5% by weight or at least 6% by weight, based on the total amount of glass. However, the proportion of $Na_2O$ in the glass may be limited to at most 15% by weight, such as at most 10% by weight or at most 8% by weight, based on the total amount of glass.

The proportion of $K_2O$ in the glass may be at most 5% by weight, such as at most 3% by weight each or 2% by weight, based on the total amount of glass.

The borosilicate glass may also contain additives besides the above-mentioned components. These additives may, for example, be alkaline earth metal oxides (e.g. BaO, CaO) which may be added to the glass to manipulate the flowing and melting properties or the chemical resistance of the glass. In addition, or alternatively, the glass may contain oxides of d group metals, such as iron oxides (FeO, $Fe_2O_3$, or $Fe_3O_4$). Iron oxides are common impurities of the main components of the glass, in particular impurities of the sand.

The proportion of BaO in the glass may be at most 6% by weight, such as at most 4% by weight each or 3% by weight, based on the total amount of glass.

The proportion of CaO in the glass may be at most 5% by weight, such as at most 3% by weight each or 2% by weight, based on the total amount of glass.

The proportions of $Fe_2O_3$ in the glass may be at most 3% by weight, such as at most 2% by weight each or 1.5% by weight, based on the total amount of glass.

The glass compositions may also comprise titanium dioxide. The content of $TiO_2$ in the glass is at most 10% by weight, such as at most 8% by weight or at most 6% by weight, based on the total amount of glass. Very high contents of $TiO_2$ may result in undesirable crystallization of the glass.

In some embodiments, the glass may comprise in weight percentages:

| | |
|---|---|
| $SiO_2$ | 65-83 |
| $B_2O_3$ | 0-15 |
| $Al_2O_3$ | 1-13 |
| $Na_2O$ | 3-13 |
| $K_2O$ | 0-3 |
| $Li_2O$ | 0-0.1 |
| CaO | 0-8 |
| BaO | 0-4.5 |
| $ZrO_2$ | 0-0.1 |
| $TiO_2$ | 0-1 |
| $Fe_2O_3$ | 0-3 |

The cross-sectional area (CSA) is determined using the outer diameter (OD) and the wall thickness (WT) of the glass tube at a given cross-section, wherein in a first step an inner diameter (ID) is calculated according to:

$$ID = OD - WT \cdot 2$$
$$CSA = \frac{\pi}{4}(OD^2 - ID^2)$$

The term "outer diameter" as used herein refers to the maximum distance between two points on the outer surface of the glass tube, wherein the two points are connected by a straight line, which is perpendicular to and intersects with the longitudinal axis of the glass tube.

The term "inner diameter" as used herein refers to the maximum distance between two points on the inner diameter of the glass tube, wherein the two points are connected by a straight line, which is perpendicular to and intersects with the longitudinal axis of the glass tube.

The term "wall thickness" as used herein describes the shortest distance between the inner and outer surface of the glass tube.

At least one of the cross-sections may be positioned in a first section of the glass tube and a second cross-section may be positioned in a second or third section of the glass tube. The first section may range from the first end of the glass tube in a longitudinal direction towards the second end thereof and it may have a length of one third of the tube's length. The third section may range from the second end of the glass tube in a longitudinal direction towards the first end thereof and it may have a length of one third of the tube's length. The second section may be positioned between the first and third sections and having a length of one third of the tube's length in a longitudinal direction.

The relative cross-sectional area deviation can be based on two single cross-sectional area values that may be determined, for instance, in the first and third sections of the glass tube, or first and second sections, or second and third sections of the glass tube. In some embodiments, one cross-sectional area value is determined in each of the three sections. The relative cross-sectional area deviation may also be based on more than two or three cross-sectional area values, i.e. on four, five, six, seven, eight, nine, ten or more cross-sectional area values. Each cross-sectional area value may be determined at a specific cross-section of the tube. If the cross-sectional area values are determined at more than two cross-sections, the distances between each cross-section and its neighboring cross-section(s) may be equal or different.

The glass tube provided according to the present disclosure may have a length of at least 0.50 m, such as a length of at least 1.00 m or a length of at least 1.25 m. The length of the glass tube may be up to 3.00 m, up to 2.00 m or up to 1.70 m. The present invention provides for a glass tube with the desired relative cross-sectional area deviation even at a length of more than 1.00 m. In some embodiments, the length of the glass tube is about 1.5 m.

In some embodiments, the glass tube has an outer diameter of at least 6.0 mm or at least 10.0 mm. The outer diameter may be up to 55.0 mm, up to 40.0 mm or up to 25.0 mm. In some embodiments, the outer diameter may be chosen between 6 mm and 55 mm, or from 6 mm to 25 mm. The wall thickness may vary between 0.3 mm and 3.5 mm. In some embodiments, the wall thickness is at least 0.5 mm, at least 0.7 mm or at least 1.0 mm. Optionally, the wall thickness may be up to 3.5 mm, up to 3.0 mm or up to 2.0 mm. The single values of the outer diameter and the wall thickness strongly depend on the intended use of the glass tube.

A glass tube for pharmaceutical containers, particularly tubes for syringes, may provide an outer diameter between 6.0 mm and 23.0 mm and/or a wall thickness between 0.75 mm and 2.5 mm. An exemplary embodiment comprises an outer diameter between 6.7 mm and 7.0 mm and a wall thickness between 1.0 mm and 1.2 mm. Another exemplary embodiment comprises an outer diameter between 8.00 mm and 8.30 mm and a wall thickness between 0.8 mm and 1.0 mm. Another exemplary embodiment comprises an outer diameter between 10.0 mm and 11.5 mm and a wall thickness between 1.0 mm and 1.2 mm. Another exemplary embodiment comprises an outer diameter between 14.0 mm and 15.0 mm and a wall thickness between 1.2 mm and 1.4 mm. Another exemplary embodiment comprises an outer diameter between 16.5 mm and 17.5 mm and a wall thickness between 1.3 mm and 1.5 mm. Another exemplary embodiment comprises an outer diameter between 21.0 mm and 23.0 mm and a wall thickness between 1.4 mm and 1.6 mm.

A glass tube for pharmaceutical containers, particularly a tube for cartridges, may provide an outer diameter between 8.0 mm and 19.0 mm and a wall thickness between 0.75 mm and 1.4 mm. An exemplary embodiment comprises an outer diameter between 8.5 mm and 8.8 mm and a wall thickness between 0.8 mm and 1.0 mm. Another exemplary embodiment comprises an outer diameter between 10.5 mm and 11.5 mm and a wall thickness between 1.0 mm and 1.2 mm. Another exemplary embodiment comprises an outer diameter between 10.5 mm and 11.5 mm and a wall thickness between 0.75 mm and 0.95 mm. Another exemplary embodiment comprises an outer diameter between 11.0 mm and 12.0 mm and a wall thickness between 0.9 mm and 1.1 mm. Another exemplary embodiment comprises an outer diameter between 13.5 mm and 14.5 mm and a wall thickness between 0.9 mm and 1.2 mm. Another exemplary embodiment comprises an outer diameter between 14.0 mm and 15.0 mm and a wall thickness between 1.2 mm and 1.4 mm. Another exemplary embodiment comprises an outer diameter between 18.0 mm and 18.5 mm and a wall thickness between 1.0 mm and 1.2 mm.

A glass tube for pharmaceutical containers, particularly a tube for vials, may have an outer diameter between 6.0 mm and 55.0 mm and a wall thickness between 0.5 mm and 2.5 mm. An exemplary embodiment comprises an outer diameter between 6.5 mm and 9 mm and a wall thickness between 0.5 mm and 1.6 mm. Another exemplary embodiment comprises an outer diameter between 8.5 mm and 16.0 mm and a wall thickness between 0.5 mm and 1.7 mm. Another exemplary embodiment comprises an outer diameter between 14.5 mm and 18.5 mm and a wall thickness between 0.6 mm and 1.7 mm. Another exemplary embodiment comprises an outer diameter between 17.5 mm and 20.5 mm and a wall thickness between 0.6 mm and 1.7 mm. Another exemplary embodiment comprises an outer diameter between 19.5 mm and 25.5 mm and a wall thickness between 0.6 mm and 1.7 mm. Another exemplary embodiment comprises an outer diameter between 22.5 mm and 35.0 mm and a wall thickness between 0.5 mm and 1.8 mm. Another exemplary embodiment comprises an outer diameter between 29.0 mm and 37.0 mm and a wall thickness between 0.9 mm and 1.7 mm. Another exemplary embodiment comprises an outer diameter between 32.5 mm and 45.0 mm and a wall thickness between 1.2 mm and 1.8 mm. Another exemplary embodiment comprises an outer diameter between 40.0 mm and 55.0 mm and a wall thickness between 1.5 mm and 2.2 mm.

A glass tube for pharmaceutical containers, particularly a tube for ampoules may provide an outer diameter between 8.0 mm and 30.0 mm and a wall thickness between 0.2 mm and 1.0 mm. An exemplary embodiment comprises an outer diameter between 8.5 mm and 16.0 mm and a wall thickness between 0.3 mm and 0.8 mm. Another exemplary embodiment comprises an outer diameter between 14.5 mm and 18.5 mm and a wall thickness between 0.35 mm and 0.85 mm. Another exemplary embodiment comprises an outer diameter between 17.5 mm and 20.5 mm and a wall thickness between 0.45 mm and 0.85 mm. Another exemplary embodiment comprises an outer diameter between 19.0 mm and 26.0 mm and a wall thickness between 0.55 mm and 0.9 mm.

The glass tube of this invention has an inner diameter. The inner diameter may be at least 3.0 mm, at least 4.0 mm or at least 8.0 mm. In some embodiments, the inner diameter may be up to 50.0 mm, up to 40.0 mm, up to 30.0 mm or up to 20.0 mm.

Generally, it is more difficult to achieve a good uniformity factor and/or relative cross-sectional area deviation for larger cross sectional areas. In some embodiments provided according to the present invention, the glass tube has an outer diameter between 6 mm and 55 mm and a wall thickness between 0.3 mm and 3.5 mm.

In some embodiments, the glass tube provided according to the present disclosure has an average linear coefficient of thermal expansion measured in the range of 20° C. to 300° C. (CTE) between 3.0 and $8.0*10^{-6}K^{-1}$, or between 3.5 and $7.0*10^{-6}K^{-1}$, or between 4.0 and $6.0*10^{-6}K^{-1}$. It is beneficial for the glass tube to have a lower CTE. Low CTE glasses tend to produce fewer stresses during hot forming, which leads to a more uniform product. Hence, in some embodiments, the CTE is limited to no more than $6.9*10^{-6}K^{-1}$ or no more than $5.9*10^{-6} K^{-1}$. The CTE may be measured according to DIN ISO 7991:1987.

In some embodiments, the glass of the glass tube has a refractive $n_d$ index between 1.45 and 1.55, such as a refractive index between 1.49 and 1.50 or between 1.52 and 1.53.

The density of the glass tube may be between 1.8 and 3.0 $g*cm^{-3}$, such as between 2.0 and 2.8 $g*cm^{-3}$ or between 2.2 and 2.6 $g*cm^{-3}$.

In some embodiments, the outer surface of the glass tube has a protective coating that protects the glass tube against scratches. The protective coating may be removable by thermal decomposition that takes place at high temperatures. The coating material may comprise a polysorbate, such as polysorbate 80.

In some embodiments provided according to the present invention, the present invention provides a set of glass tubes, wherein at least 90% of the tubes have relative cross-sectional area deviations of $$\frac{QF_{max} - QF_{min}}{1.5 \text{ m}} < k_{90} \cdot x + t_{90}$$

wherein $QF_{max}$ is the highest cross-sectional area and $QF_{min}$ is the lowest cross-sectional area of at least two cross-sections of the tube, wherein the cross-sections are spaced apart from each other along the length of the glass tube, and wherein $k_{90}$ is 0.007 $m^{-1}$, $t_{90}$ is less than 0.30 $mm^2/m$ and x is $$\frac{QF_{max} - QF_{min}}{2}.$$

Optionally, $t_{90}$ may be 0.25 $mm^2/m$ or less, 0.20 $mm^2/m$ or less, 0.15 $mm^2/m$ or less, or 0.10 $mm^2/m$ or less. Optionally, $k_{90}$ may be 0.006 $m^{-1}$, 0.005 $m^{-1}$, or 0.004 $m^{-1}$.

At least 90% of the tubes in the set may have relative cross-sectional area deviations $$\frac{QF_{max} - QF_{min}}{1.5 \text{ m}}$$

of less than 0.70 $mm^2/m$, less than 0.60 $mm^2/m$ or less than 0.45 $mm^2/m$. The limitations given above for the single glass tube may apply to the tubes in the set accordingly. For example, a relative cross-sectional area deviation $$\frac{QF_{max} - QF_{min}}{1.5 \text{ m}}$$

may be at least 0.10 mm²/m. At most 20%, such as at most 10%, of the glass tubes in the set may have relative cross-sectional area deviations of greater than 0.50 mm²/m, or greater than 0.40 mm²/m.

At least two cross-sections, such as those corresponding to $QF_{max}$ and $QF_{min}$, may be spaced apart from each other by at least 0.5 m, by at least 0.75 m, by at least 1.0 m, or by at most 1.5 m or at most 1.4 m. In some embodiments, the cross-sections are spaced apart by about 0.5 m, about 0.75 m, about 1.0 m or about 1.5 m. Optionally, $QF_{max}$ is the highest cross-sectional area of the entire glass tube and $QF_{min}$ is the smallest cross-sectional area of the entire glass tube.

The set of glass tubes may comprise at least 100, or at least 1000 or at least 3000 glass tubes, such as at least 5000 glass tubes. In some embodiments, the set is a set of 100, 150, or 200 glass tubes.

Further, some exemplary embodiments provided according to the invention relate to a process for producing glass tubes, comprising the steps:
applying a glass melt onto an outer surface of a rotating conical mandrel by guiding the melt from a stirred feed tank through an outlet, wherein the melt forms a strand of molten glass that flows from the outlet onto the outer surface of the mandrel,
forming a hollow glass melt body on the conical mandrel,
drawing the hollow glass melt body from the conical mandrel in a predetermined direction toward a front end for forming a glass tube,
the outer surface having a wetting zone where the glass strand first contacts the conical mandrel,
wherein a spatial variation of the wetting zone of the applied glass melt is continuously monitored by measuring a horizontal movement of an edge of the glass strand, wherein the movement is essentially parallel to the drawing direction,
reducing the spatial variation by adjusting one or more process parameters selected from lateral position of the conical mandrel relative to the outlet, vertical position of the conical mandrel relative to the outlet, stirring speed in the feed tank, glass temperature, tilt angle of conical mandrel and/or rotational speed of the conical mandrel,
cooling the hollow glass melt body,
cutting the cooled glass melt body into glass tubes of desired lengths.

In some embodiments, when the spatial variation σ of the wetting zone exceeds a threshold value, the rotational speed of the conical mandrel is increased, wherein the rotational speed of the conical mandrel is within the range of from 5.0 to 20.0 rpm. In some embodiments, the rotational speed of the conical mandrel is between 5.0 to 20.0 rpm, from 9.0 to 12.0 rpm, or from 9.5 to 11.0 rpm.

The spatial variation σ is the standard deviation of the horizontal movement of the edge of the strand above the wetting zone parallel to the drawing direction. The standard deviation may be calculated from a number of measurements recorded over a period. The number of measurements may be 10 or more, 50 or more, or 100 or more. The period may be 30 seconds, 1 minute, or 5 minutes. The spatial variation may be indicated as pixels. The threshold value may be 2.4 pixels, or 2.2 pixels or 2.0 pixels. A pixel may correspond to about 70 μm.

In some embodiments, further data are collected in addition to the spatial variation of the glass strand. The collected data may be selected from the group consisting of wettability of the conical mandrel by the glass melt, outlet position, outlet width and/or the outline of the applied glass strand.

Monitoring the spatial variation of the wetting zone and/or the further data may be performed by one or more cameras.

In some embodiments, the incline of the conical mandrel is between 5° and 45°. In some embodiments, the volume flow rate of the glass melt is between 0.4 to 0.55 m³/h. In some embodiments, the temperature of the glass strand at the wetting zone is between 750° C. to 1400° C. In some embodiments, the drawing speed of the hollow glass melt body is between 0.1 and 5 m/s, optionally between 0.3 and 4.0 m/s.

In some embodiments, the present invention provides a glass tube and/or a set of glass tubes obtainable by the process.

In an aspect, the invention provides a use of a glass tube or a set of glass tubes for the production of pharmaceutical containers. In some embodiments, the containers are selected from the group consisting of ampoules, vials, syringes and/or cartridges.

Figure 1:
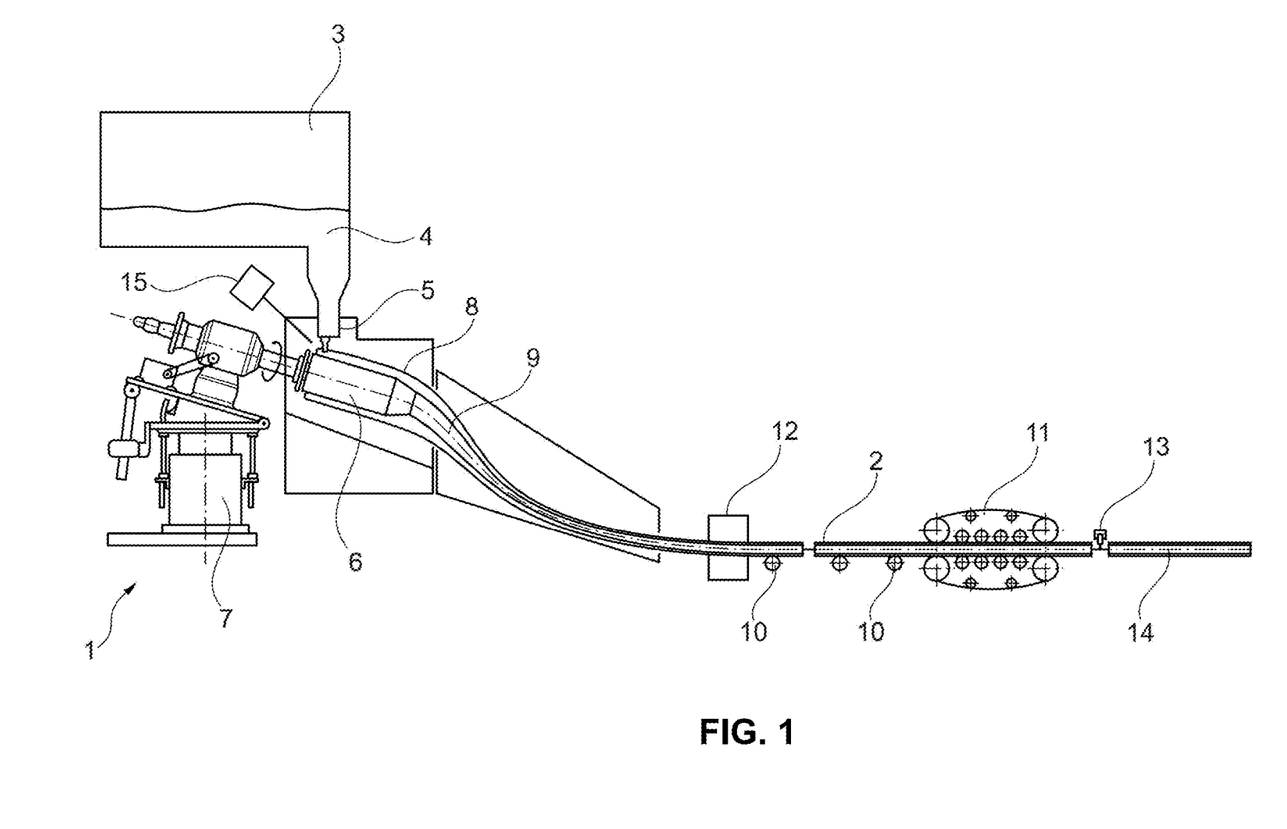
FIG. 1 illustrates a schematic sectional view of a manufacturing apparatus for an exemplary embodiment of a method provided according to the present invention.

Referring now to the drawings, the manufacturing apparatus 1 in FIG. 1 shows a device for drawing a glass tube 2 by the Danner method. The apparatus 1 comprises a feed tank 3 that contains a glass melt 4. In the feed tank, the glass melt 4 typically has a temperature of above 1300° C. and is applied via an outlet 5 onto an outer surface of a rotating conical mandrel 6 that is called a Danner pipe. The Danner pipe may rotate about an axis essentially parallel to the drawing direction.

As can be derived from FIG. 1, the conical mandrel 6 is obliquely downwardly inclined and driven by a power unit 7. The glass melt 4 flows from the outlet 5 on the outer surface of the conical mandrel 6 and forms thereon a hollow glass melt body 8. The position where the molten glass strand first touches the conical mandrel 6, while flowing from the outlet 5 towards the conical mandrel 6, is referred to as the wetting zone. The hollow glass melt body 8 is drawn from the conical mandrel 6 in a predetermined direction toward a front end. Additionally, compressed air is blown through the conical mandrel 6 to prevent the hollow glass melt body 8 from collapsing. At the front end of the conical mandrel 6 a so-called drawing onion 9 (in German: "Ziehzwiebel") is formed from which the glass tube 2 is made by hot forming.

The formed glass tube 2 is drawn over a line of support rollers 10 by a drawing device 11 situated up to 120 m away from the conical mandrel 6, thereby passing a monitoring unit 12 that monitors the glass tube 2 in regard to different quality parameters, for instance wall thickness, bubbles etc. At the end of the line, a cutting device 13 cuts the formed glass tube 2 into single glass tubes 14.

The wetting zone of the applied glass melt 4 is continuously recorded by a camera 15 to collect data of the melt flowing from the outlet 5. The collected data are analyzed by an analyzing unit (not shown). Based on the results at least one of the parameters selected from the group consisting of lateral position of the conical mandrel 6 relative to the outlet 5, vertical position of the conical mandrel 6 relative to the outlet 5, stirring speed in the feed tank 3, glass temperature, tilt angle of conical mandrel 6 and/or rotational speed of the conical mandrel 6 is adjusted in order to reduce a spatial variation of an edge of the glass strand in a direction essentially parallel to the drawing direction.

Figure 2:
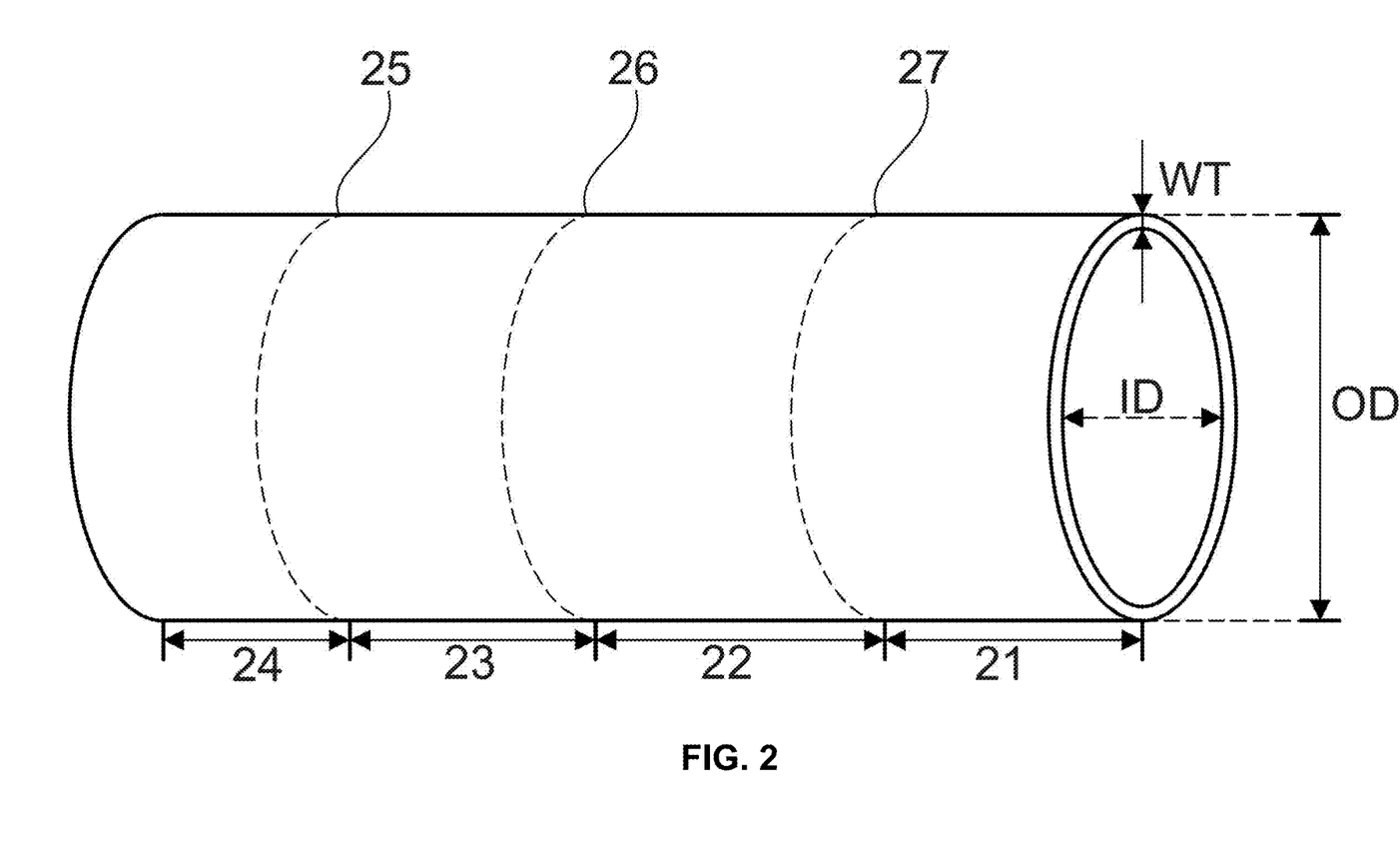
FIG. 2 illustrates an exemplary embodiment of a glass tube provided according to the present invention.

FIG. 2 shows an example of a glass tube 14 having an outer diameter OD, an inner diameter ID and a wall thickness WT. The outer diameter can be measured at a first cross-section 25 in a first section of the glass tube, a second cross-section 26 in a second section of the glass tube 14 and a third cross-section 27 in a third section of the glass tube 14. The first cross-section 25 may be spaced apart a distance 24 from the first edge of the tube. The second cross-section 26 may be disposed at a distance 23 from the first cross-section 25. The third cross-section 27 may be disposed at a distance 22 from the second cross-section 26. The third cross-section 27 may be at a distance 21 from the second edge of the glass tube. The distances 21, 22, 23 and 24 may each be about one fourth of the tube length. Optionally, distances 22 and 23 are of about the same length.

Figure 3:
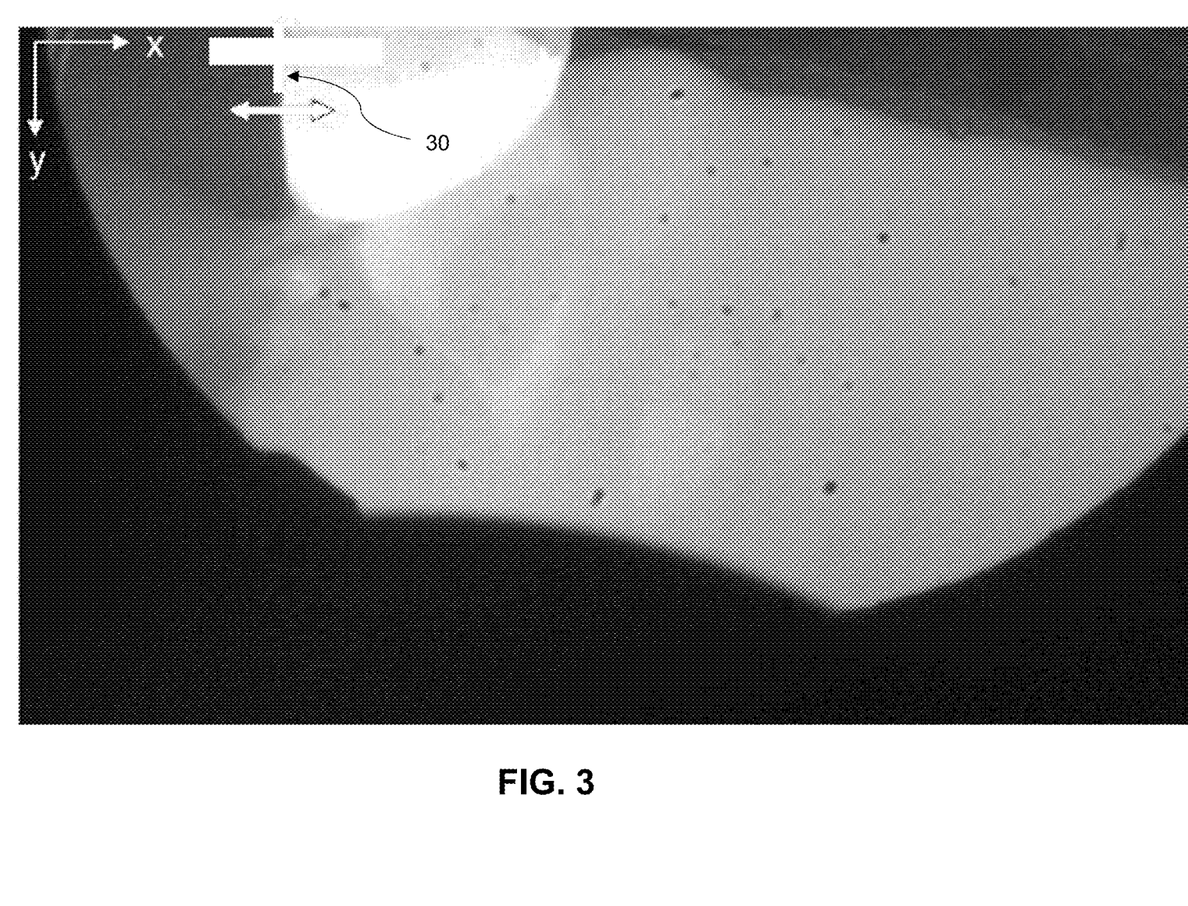
FIG. 3 illustrates a camera image of a wetting zone where a glass strand first touches a mandrel.

FIG. 3 shows a camera image of the wetting zone, where the glass strand first touches the mandrel. The glass strand has an edge 30 The X direction is horizontal and essentially parallel to the drawing direction. During operation, edge 30 will make movements in the X direction that can be monitored with a camera by observing the black-white-edge 30. These movements are monitored during the process and process parameters may be adjusted in order to stabilize the wetting zone by reducing the movement of the wetting zone in the X direction.

Figure 4:
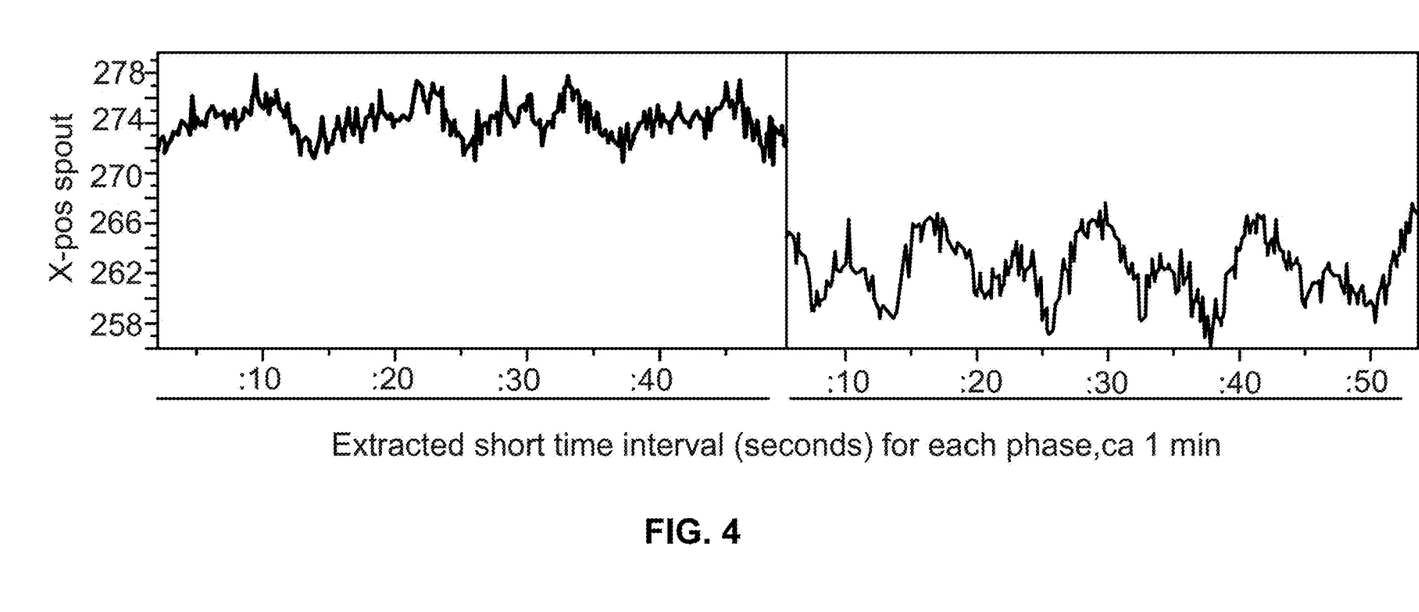
FIG. 4 is a graph illustrating an extent of movement of an edge of the glass strand in an X direction during operation.

FIG. 4 shows the extent of movement of the edge 30 in X direction during operation. The right part of the diagram shows stronger movement, hence less stability, of the glass strand compared to the left part.

Figure 5:
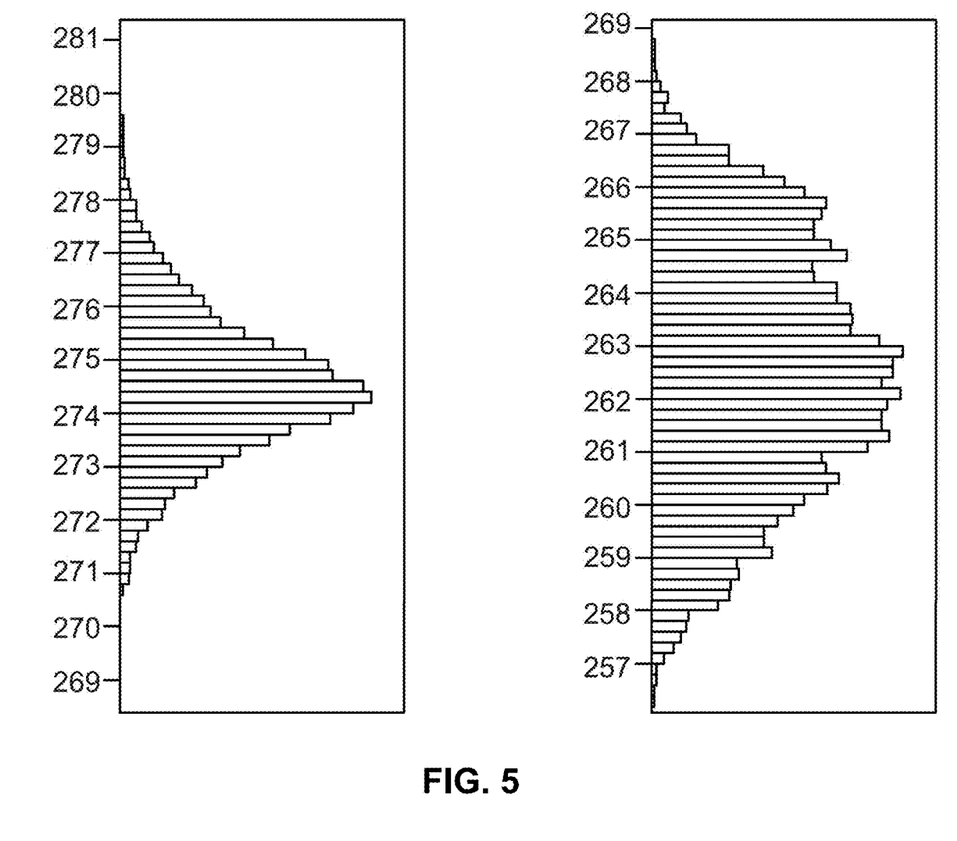
FIG. 5 is a distribution diagram of locations of the edge of the glass strand during a measurement period.

FIG. 5 shows distributions of locations of the edge of the glass strand during a measurement period. The left diagram shows a narrow distribution, whereas the right diagram shows stronger movement (instability).

EXAMPLES

Example 1

A glass tube 14 of 1.5 m length was prepared using the Danner method described in this disclosure. The glass processed in this manner had the following VFT constants: A=−1.41; B=5047.3; $T_0$=224.7° C.

Three cross-sectional area values along the length of the corresponding glass tube 14 were determined. The first value was determined by measuring the outer diameter and the wall thickness of a first cross-section 25, the second value was determined by measuring the outer diameter and the wall thickness of a second cross-section 26 and the third value was determined by measuring the outer diameter and the wall thickness of a third cross-section 27. The sizes of the three cross-sectional areas were compared to determine which was the largest of the three ($QF_{max}$), and which was the smallest ($QF_{min}$). Measurements were repeated for three tubes. For Tube 1, the highest cross-sectional area $QF_{max}$ was measured at the first cross-section 25. The lowest cross-sectional area $QF_{min}$ was measured at the third cross-section 27. For Tubes 2 and 3, the third cross-sections 27 were the largest and the first cross-section 25 was the smallest. The results are shown in the following table.

| | Tube 1 | Tube 2 | Tube 3 |
|---|---|---|---|
| $QF_{min}$ | 29.398 mm² | 29.579 mm² | 29.311 mm² |
| $QF_{max}$ | 29.463 mm² | 29.643 mm² | 29.357 mm² |
| $\dfrac{QF_{max} - QF_{min}}{1.5 \text{ m}}$ | 0.0433 mm²/m | 0.0427 mm²/m | 0.031 mm²/m |
| $\dfrac{QF_{max} - QF_{min}}{2}$ | 29.431 mm² | 29.611 mm² | 29.334 mm² |
| k * x + t | 0.218 mm²/m | 0.218 mm²/m | 0.217 mm²/m |

Example 2

Glass tubes 14 were produced according to the Danner method. During operation, the spatial variation of the glass strand (FIG. 3) was monitored using a camera 15. The spatial variation is the movement of the edge 30 of the glass strand as the glass flows onto the conical mandrel 6. FIG. 5 shows the distribution of the X-position of the black-white-edge 30 in a first time interval. In this first interval, the rotational speed of the conical mandrel 6 was 9.7 rpm and the spatial variation σ was about 2.35 pixels.

In a second time interval, the rotational speed was adjusted to reduce the spatial variation σ of the edge 30 of the glass strand. After adjustment, the rotational speed was 10.3 rpm and the spatial variation was reduced to 1.35 pixels.

The first interval had a broad distribution of locations of the edge of the glass strand, i.e. stronger movement of the glass strand in the wetting zone. The second interval had a narrower distribution. Broad and narrow distributions are shown in FIG. 5, wherein the left diagram shows a narrow distribution and the right diagram illustrates a stronger movement of the glass strand.

The influence of the process parameters on the uniformity of the glass tubes 14 is given in the following table.

| | 1$^{st}$ interval | 2$^{nd}$ interval |
|---|---|---|
| rotational speed | 9.7 rpm | 10.3 rpm |
| spatial variation of edge 30 | 2.35 pixels | 1.35 pixels |
| $\dfrac{QF_{max} - QF_{min}}{1.5 \text{ m}}$ | 0.038 mm²/m | 0.030 mm²/m |
| $\dfrac{QF_{max} - QF_{min}}{2}$ | 33.738 mm² | 33.696 mm² |
| k * x + t | 0.228 mm²/m | 0.228 mm²/m |

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

REFERENCES 1 manufacturing plant
2 glass tube
3 reservoir
4 glass melt
5 outlet
6 conical mandrel
7 power unit
8 glass melt body
9 onion
10 support rollers
11 drawing device
12 monitoring unit
13 cutting device
14 single glass tubes
15 camera
21 distance between second edge and third cross-section
22 distance between second and third cross-sections
23 distance between first and second cross-sections
24 distance between first cross-section and first edge
25 first cross-section
26 second cross-section
27 third cross-section
30 edge of glass strand, X-direction

What is claimed is:

1. At least one glass tube comprising a glass and having a relative cross-sectional area deviation defined as $$\frac{QF_{max} - QF_{min}}{1.5 \text{ m}}, \text{ wherein } \frac{QF_{max} - QF_{min}}{1.5 \text{ m}} < k \cdot x + t,$$

wherein $QF_{max}$ is a highest cross-sectional area and $QF_{min}$ is a lowest cross-sectional area of at least two cross-sections of the at least one glass tube, wherein the at least two cross-sections are spaced apart from each other along a length of the at least one glass tube, and wherein k is 0.0023 m$^{-1}$, t is less than 0.15 mm$^2$/m and x is $$\frac{QF_{max} + QF_{min}}{2},$$

wherein a distance between the at least two cross-sections is at least 0.5 m in a direction of a longitudinal axis of the at least one glass tube.

2. The at least one glass tube of claim 1, wherein the distance between the at least two cross-sections is at least 0.75 m in the direction of the longitudinal axis of the at least one glass tube.

3. The at least one glass tube of claim 2, wherein the distance between the at least two cross-sections is at least 1.0 m in the direction of the longitudinal axis of the at least one glass tube.

4. The at least one glass tube of claim 1, wherein the relative cross-sectional area deviation is less than 0.50 mm$^2$/m.

5. The at least one glass tube of claim 4, wherein the relative cross-sectional area deviation is less than 0.45 mm$^2$/m.

6. The at least one glass tube of claim 1, wherein one of the at least two cross-sections is positioned in a first section of the at least one glass tube and a second cross-section of the at least two cross-sections is positioned in a second section or a third section of the at least one glass tube.

7. The at least one glass tube of claim 1, wherein the at least one glass tube has a uniformity factor of at least 0.990, wherein the uniformity factor is a ratio of a lowest cross-sectional area of an entirety of the at least one glass tube and a highest cross-sectional area of the entirety of the at least one glass tube.

8. The at least one glass tube of claim 7, wherein the at least one glass tube has a uniformity factor of at least 0.993.

9. The at least one glass tube of claim 1, wherein the length is at least 1.00 m.

10. The at least one glass tube of claim 1, wherein the at least one glass tube has an outer diameter between 6.0 mm and 55.0 mm or a wall thickness between 0.3 mm and 3.5 mm.

11. The at least one glass tube of claim 1, wherein t is less than 0.10 mm$^2$/m.

12. The at least one glass tube of claim 1, wherein t is less than 0.05 mm$^2$/m.

13. The at least one glass tube of claim 1, wherein k is 0.0020 m$^{-1}$.

14. The at least one glass tube of claim 1, wherein the glass has the following Vogel-Fulcher-Tammann (VFT) constants:

A ranging from −5.0 to 0.0;
B ranging from 4,000 to 12,000; and
$T_0$ ranging from 1° C. to 250° C.

15. The at least one glass tube of claim 1, wherein the glass comprises the following components in weight percent (wt.-%):

| | |
|---|---|
| SiO$_2$ | 50-90 |
| B$_2$O$_3$ | 0-20 |
| Al$_2$O$_3$ | >0-18 |
| Na$_2$O | 0-15 |
| K$_2$O | 0-5 |
| Li$_2$O | 0-2 |
| CaO | 0-15 |
| BaO | 0-6 |
| ZrO$_2$ | 0-5 |
| TiO$_2$ | 0-5 |
| Fe$_2$O$_3$ | 0-3. |

16. The at least one glass tube of claim 1, wherein the at least one glass tube comprises a set of glass tubes and at least 90% of the glass tubes of the set have relative cross-sectional area deviations of $$\frac{QF_{max} - QF_{min}}{1.5 \text{ m}} < k_{90} \cdot x + t_{90},$$

wherein $k_{90}$ is 0.007 m$^{-1}$ and $t_{90}$ is less than 0.30 mm$^2$/m.

17. The at least one glass tube of claim 16, wherein the set of glass tubes comprises at least 100 glass tubes.

18. The at least one glass tube of claim 16, wherein at least 90% of the glass tubes of the set have relative cross-sectional deviations $$\frac{QF_{max} - QF_{min}}{1.5 \text{ m}}$$

of less than 0.70 mm²/m.

* * * * *